US011403401B2

(12) United States Patent
Gajananan et al.

(10) Patent No.: US 11,403,401 B2
(45) Date of Patent: Aug. 2, 2022

(54) PREVENTING UNAUTHORIZED PACKAGE DEPLOYMENT IN CLUSTERS

(71) Applicant: INTERNATIONAL BUSINESS MACHINES CORPORATION, Armonk, NY (US)

(72) Inventors: Kugamoorthy Gajananan, Tokyo (JP); Hirokuni Kitahara, Tokyo (JP); Yuji Watanabe, Tokyo (JP); Ruriko Kudo, Saitama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/906,451

(22) Filed: Jun. 19, 2020

(65) Prior Publication Data
US 2021/0397712 A1 Dec. 23, 2021

Related U.S. Application Data

(60) Provisional application No. 63/040,158, filed on Jun. 17, 2020.

(51) Int. Cl.
*G06F 21/00* (2013.01)
*G06F 21/57* (2013.01)
(Continued)

(52) U.S. Cl.
CPC .............. *G06F 21/57* (2013.01); *G06F 21/64* (2013.01); *G06F 8/60* (2013.01); *G06F 2221/033* (2013.01)

(58) Field of Classification Search
CPC . G06F 21/57; G06F 21/64; G06F 8/60; G06F 2221/033
See application file for complete search history.

(56) References Cited

U.S. PATENT DOCUMENTS

| 10,404,474 B1 | 9/2019 | Caceres et al. |
| 2010/0031308 A1* | 2/2010 | Khalid .................... G06F 21/51 726/1 |

(Continued)

FOREIGN PATENT DOCUMENTS

| CN | 103167010 A | 6/2013 |
| CN | 107491343 A | 12/2017 |

(Continued)

OTHER PUBLICATIONS

Portieris, "A Kubernetes Admission Controller for the Enforcement of Image Security Policies", Available: https://github.com/IBM/portieris. [Acc.: May 5, 2020], last downloaded Jun. 17, 2020, 3 pages.

(Continued)

*Primary Examiner* — Ghazal B Shehni
(74) *Attorney, Agent, or Firm* — Tutunjian & Bitetto, P.C.; Randall Bluestone

(57) ABSTRACT

A method for checking an integrity of an object to be deployed to a cluster is provided. The method detects a resource creation request. The method, responsive to the request being an initial resource creation request for the object, verifies the integrity of the object based on properties in the request to create a release secret in the cluster for a positive integrity verification result for the object. The release secret represents a specific deployment configuration of the object on the cluster. The method, responsive to the request being other than the initial resource request, checks if the request corresponds to the specific deployment configuration of the object by checking against the release secret in the cluster. The method, responsive to the request corresponding to a deployment of the object and the release secret being present in the cluster, creates a resource requested by the request in the cluster.

20 Claims, 14 Drawing Sheets

(51) Int. Cl.
    *G06F 21/64*     (2013.01)
    *G06F 8/60*     (2018.01)

(56)     References Cited

U.S. PATENT DOCUMENTS

| | | |
|---|---|---|
| 2018/0309747 A1 | 10/2018 | Sweet et al. |
| 2018/0321993 A1 | 11/2018 | McClory et al. |
| 2019/0065323 A1* | 2/2019 | Dhamdhere ........ G06F 11/3452 |
| 2019/0260822 A1 | 8/2019 | Yin et al. |

FOREIGN PATENT DOCUMENTS

| | | |
|---|---|---|
| CN | 110351104 A | 10/2019 |
| CN | 110661657 A | 1/2020 |

OTHER PUBLICATIONS

Mell et al. "The NIST Definition of Cloud Computing", NIST Special Publication 800-145, 2011, 7 pages.
International Search Report issued in PCT Application No. PCT/IB2021054358, dated Sep. 6, 2021, pp. 1-9.

* cited by examiner

```
{
  "apiVersion": "v1",
  "kind": "Secret",
  "data": {
    "release": "SDRzSUFBQU..."    ⎫
                                   ⎬ 910
  },                               ⎭
  "metadata": {
     name: "sh.helm.release.v1.ac-test-
app1.v1"
  },
  ...
}
```

FIG. 9

```
{
    "name": "ac-test-app1",
    ...
    "chart": {
        "metadata": {
            "name": "ac-test-chart",
            "version": "0.1.0",
            "description": "A Helm chart for Kubernetes",
            "apiVersion": "v2",
            "appVersion": "3.7",
            "type": "application"
        },
        "templates": [
            ...
            {
                "name": "templates/deployment.yaml",
                "data": ...
            }
        ]
    }
}
```

```
Input:
  Incoming k8s API request
    Resource   (name, kind, namepsace)
    Operation: CREATE, UPDATE, DELETE Output:
  verdict: ALLOW or REJECT
  annotations: add "integrityVerified=true" to resource.
  reasonFail: Error message Steps:

if (Is Internal k8s System Request == Yes):
    Return verdict "ALLOW"
  else:
    if ( Operation is "CREATE ):
        HandleCreationRequest ()
    else if ( Operation is "UPDATE" ):
        HandleUpdateRequest ()
    else
        return verdict ALLOW
```

```
        function HandleCreationRequest:
            s1: Check if a request is the first resource creation
                originating from an application deployment package ┌ if ( First Request == Yes ):
         │     s2: Get resource signature for resource in the first
    R1 ──┤         request
         │     s3: Verify integrity of resource in the first request
         └     ReturnVerdict()

┌ else if ( Is Resource Associzated == Yes ):
    R2 ──┤     s4: Verify integrity of associated resource in request
         └     ReturnVerdict(ALLOW)

┌ else if ( Verified Owners Hierarchy Found = Yes ):
         │             ReturnVerdict()
    R3 ──┤     else
         │             ReturnVerdict(REJECT, "No verified owners")
         └ else:
         ┌     s5: Get resource signature
    R4 ──┤     s6: Verify integrity of resource in request
         └     ReturnVerdict()

---
        function HandleUpdateRequest:
         ┌     s5: Get resource signature
    R5 ──┤     s7: Verify integrity of resource in request
         └     ReturnVerdict()

---
        function ReturnVerdict (msg)
         ┌     if (Integrity Check Passed = Yes):
         │         Annotate resource by
    R6 ──┤             adding "integrityVerified=true" flag
         └         Return verdict "ALLOW"
    R7 ──┤     else:
                   Return Verdict "REJECT", reasonFail=msg
```

FIG. 12 ary com-
PREVENTING UNAUTHORIZED PACKAGE DEPLOYMENT IN CLUSTERS

RELATED APPLICATION INFORMATION

This application claims priority to U.S. Provisional Patent Application Ser. No. 63/040,158, filed on Jun. 17, 2020, the entire contents of which is incorporated herein by reference.

BACKGROUND

The present invention relates generally to information processing and, in particular, to preventing unauthorized helm-based application package deployment and resource changes in k8s clusters.

Kubernetes (also referred to as "k8s") is an open-source container-orchestration system for automating application deployment, scaling, and management. Kubernetes aims to provide a platform for automating deployment, scaling, and operations of application containers across clusters of hosts.

The goal for the cluster side integrity is to verify the following: (a) package content is signed with authorized signer's key; and (b) all admission requests are not changed (tampered) from the resource creation requests derived from the signed package content.

Existing approaches to cluster side integrity rely on client-side verification (e.g. helm verify), but are vulnerable to malicious clients. Cluster-side verification is not easy, because it is difficult to (a) identify package content from individual admission requests at cluster side, (b) distinguish admission requests for the packages from all other admission requests, and (c) verify integrity of admission requests since it requires resource creation requests only seeable by the client.

SUMMARY

According to aspects of the present invention, a computer-implemented method executed by a server in a cluster for checking an integrity of an object to be deployed to the cluster is provided. The method includes detecting a resource creation request from a client. The method further includes, responsive to the resource creation request being an initial resource creation request for the object, verifying the integrity of the object based on properties in the resource creation request to create a release secret in the cluster for a positive integrity verification result for the object. The release secret represents a specific deployment configuration of the object on the cluster. The method also includes, responsive to the resource creation request being other than the initial resource request, checking if the resource creation request corresponds to the specific deployment configuration of the object by checking against the release secret in the cluster. The method additionally includes, responsive to the resource creation request corresponding to a deployment of the object and the release secret being present in the cluster, creating a resource requested by the resource creation request in the cluster.

According to other aspects of the present invention, a computer program product is provided. The computer program product includes a non-transitory computer readable storage medium having program instructions embodied therewith, the program instructions executable by a computer to cause the computer to perform a method executed by a server in a cluster for checking an integrity of an object to be deployed to the cluster. The method includes detecting a resource creation request from a client. The method further includes, responsive to the resource creation request being an initial resource creation request for the object, verifying the integrity of the object based on properties in the resource creation request to create a release secret in the cluster for a positive integrity verification result for the object. The release secret represents a specific deployment configuration of the package on the cluster. The method also includes, responsive to the resource creation request being other than the initial resource request, checking if the resource creation request corresponds to the specific deployment configuration of the object by checking against the release secret in the cluster. The method additionally includes, responsive to the resource creation request corresponding to a deployment of the object and the release secret being present in the cluster, creating a resource requested by the resource creation request in the cluster.

According to yet other aspects of the present invention, a server in a cluster for checking an integrity of an object to be deployed to the cluster is provided. The server includes a memory configured to store program code. The server further includes a hardware processor configured to run the program code to detect a resource creation request from a client. The hardware processor further runs the program code to, responsive to the resource creation request being an initial resource creation request for the object, verify the integrity of the package based on properties in the resource creation request to create a release secret in the cluster for a positive integrity verification result for the object, the release secret representing a specific deployment configuration of the object on the cluster. The hardware processor also runs the program code to, responsive to the resource creation request being other than the initial resource request, check if the resource creation request corresponds to the specific deployment configuration of the object by checking against the release secret in the cluster. The hardware processor additionally runs the program code to, responsive to the resource creation request corresponding to a deployment of the package and the release secret being present in the cluster, create a resource requested by the resource creation request in the cluster.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 9 is a diagram showing an exemplary pseudocode for a release secret, in accordance with an embodiment of the present invention;

FIG. 10 is a diagram showing an exemplary pseudocode for a decoded data release, in accordance with an embodiment of the present invention;

FIG. 11 is a diagram showing cluster-side integrity enforcement steps, in accordance with an embodiment of the present invention;

FIG. 12 is a diagram showing cluster-side integrity enforcement functions, in accordance with an embodiment of the present invention;

DETAILED DESCRIPTION

Embodiments of the present invention are directed to preventing unauthorized helm-based application package deployment and resource changes in k8s clusters.

The present invention provides a cluster-side integrity verification mechanism to meet the following conditions: (a) identify any admission requests originated from a Helm installation; (b) identify package content from each individual admission request; and (c) detect any unauthorized changes in admission requests without relying on client-side verification.

One or more embodiments of the present invention can involve identifying application package content from individual admission requests by detecting an initial admission request with a release secret and correlating other admission requests, which correspond to the specific package deployment for creating the individual resources included in the package. Properties of the requests can include, for example, a Helm release name and an owner reference.

One or more embodiments of the present invention can distinguish admission requests corresponding to the specific package deployment from a large number of admission requests received at a cluster using the properties in the request.

One or more embodiments of the present invention can verify the integrity of an application package deployment using an integrity chain. For example, for each resource creation request, using the signed helm package (template) and signed deployment configuration, (a) create the expected resource definition and (b) compare it with the resource definition in the incoming admission request.

One or more embodiments of the present invention: (a) provide a cluster-side integrity enforcement over application packages without relying any client-side verification; (b) handle the variations in application packaging and deployments; and (c) prevent unauthorized resource configurations changes on application packages during their entire lifetime. In addition, embodiments of the present invention make no changes in application bundles or packaging tools while enforcing integrity.

Figure 1:
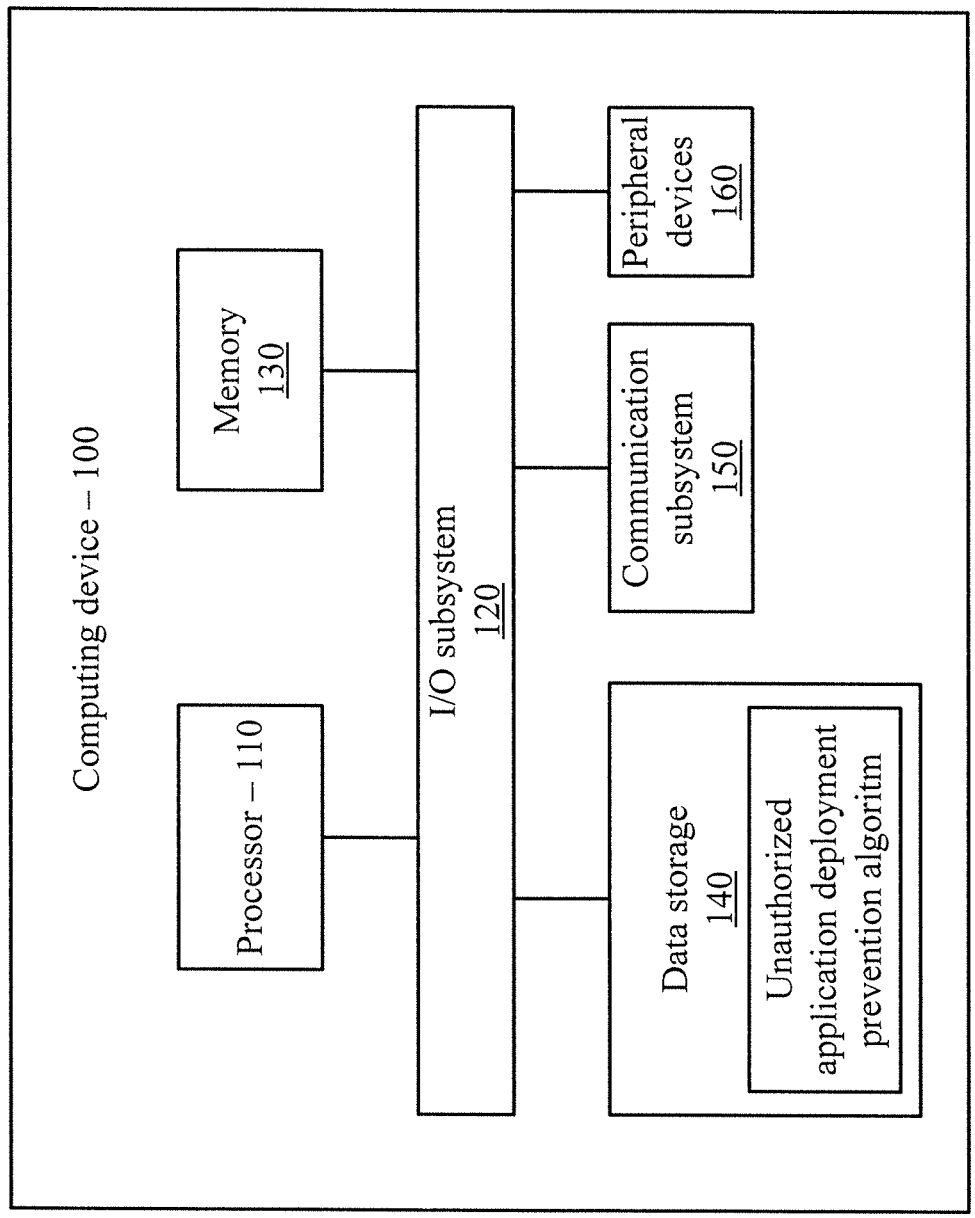
FIG. 1 is a block diagram showing an exemplary computing device, in accordance with an embodiment of the present invention.

FIG. 1 is a block diagram showing an exemplary computing device 100, in accordance with an embodiment of the present invention. Computing device 100 is representative of a device/node in a k8s cluster 210 in environment 200 shown in FIG. 2. The computing device 100 is configured to perform prevention of unauthorized Helm based application package deployment and resource changes in K8s clusters.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for preventing unauthorized helm-based application package deployment and resource changes in k8s clusters. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
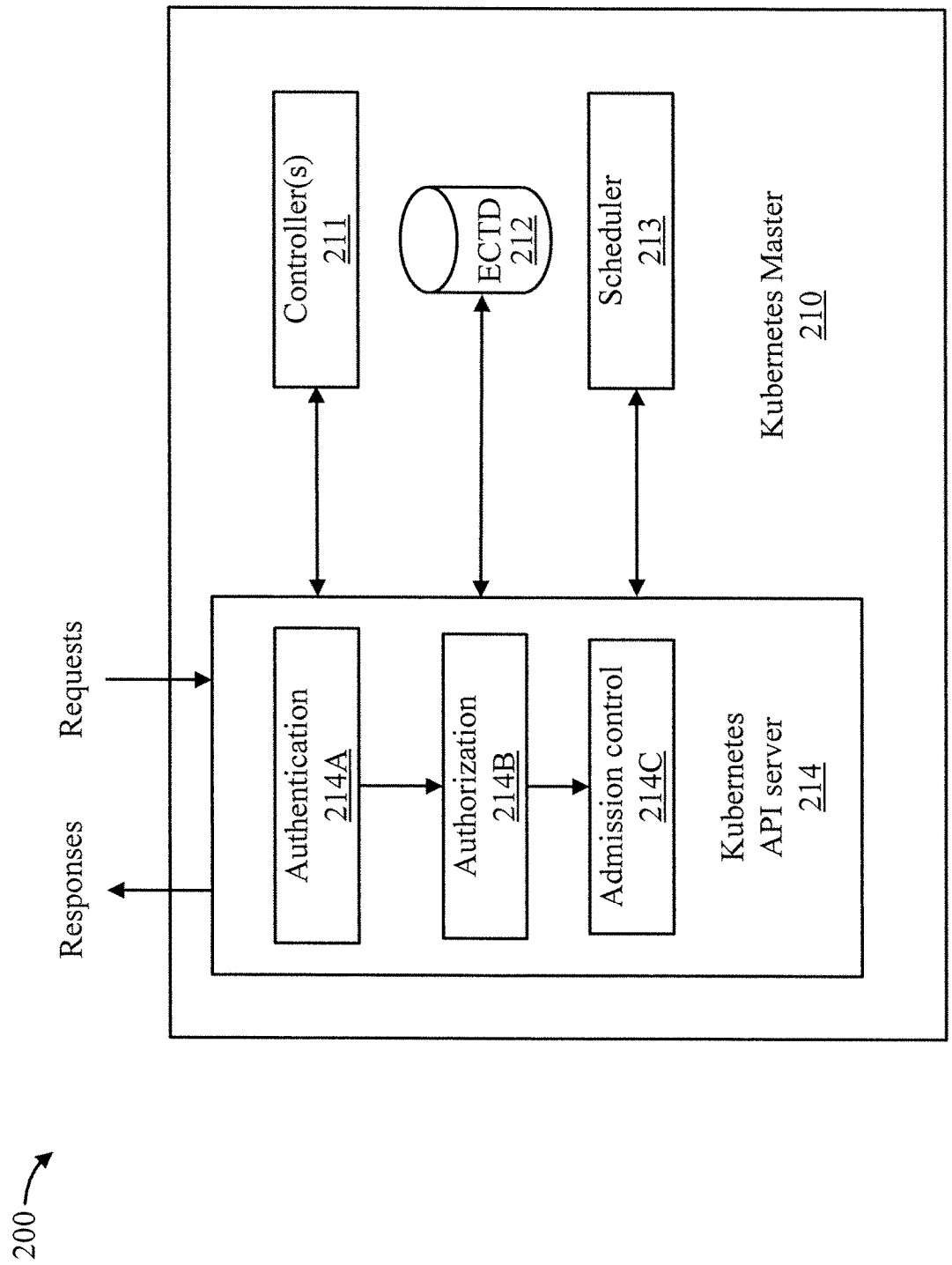
FIG. 2 is a block diagram showing an exemplary Kubernetes architecture to which the present invention can be applied, in accordance with an embodiment of the present invention.
Figure 3:
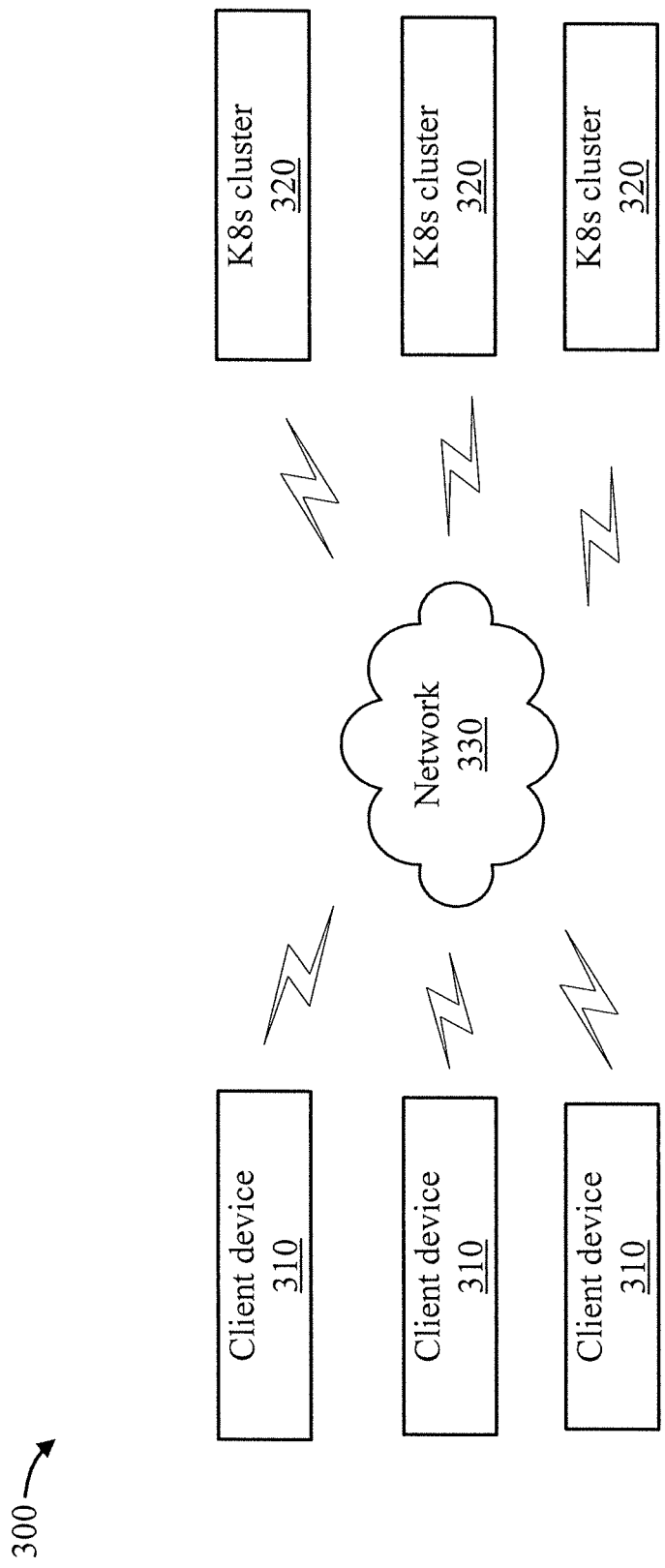
FIG. 3 is a block diagram showing an exemplary computing environment, in accordance with an embodiment of the present invention.

The hardware processor can embody one or more elements in the cluster shown in FIGS. 2 and 3.

These and other variations of a hardware processor subsystem are also contemplated in accordance with embodiments of the present invention.

FIG. 2 is a block diagram showing an exemplary Kubernetes architecture 200 to which the present invention can be applied, in accordance with an embodiment of the present invention.

The Kubernetes architecture 200 includes a Kubernetes master 210. The Kubernetes master 210 includes controllers 211, a ETCD 212, a scheduler 213, and a Kubernetes API server 214. The Kubernetes API server 214 includes an authentication stage 214A, an authorization stage 214B, and an admission stage/controller(s) 214C.

A user may initiate a request to create or update or delete a k8s resource via a client tool (kubectl, Helm etc.). When a request reaches the k8s API server 214, it goes through several stages: authentication 214A, authorization 214B and admission control 214C. After authentication and authorization steps, a request is intercepted by admission controller 214C, prior to persistence of the object specified in the request. The admission controller 214C can modify or reject requests. Various ones of these elements will be described in further detail herein below.

Alongside the admission controller 214C, one may use admission webhooks as part of the admission chain. K8s defines admission webhooks as HTTP callbacks and registers them based on the resource type and the request method. A custom admission webhook may process the incoming request sent by the k8s API server 214 and returns its verdict (allow or deny etc.) to the k8s API based on its logic. In addition, among two types of admission webhooks, mutating admission webhook may modify a review request based on a custom logic. An example would be that annotations may be added to a resource being created or updated via an incoming request.

FIG. 3 is a block diagram showing an exemplary computing environment 300, in accordance with an embodiment of the present invention.

The environment 300 includes multiple k8s clusters (collectively denoted by the figure reference numeral 310) and multiple Helm client devices (collectively denoted by the figure reference numeral 320).

Communication between the entities of environment 300 can be performed over one or more networks 330. For the sake of illustration, a wireless network 330 is shown. In other embodiments, any of wired, wireless, and/or a combination thereof can be used to facilitate communication between the entities.

The k8s cluster 310 can observe all incoming requests (admission requests).

A Helm client device 310 includes a package installer 310A which includes the following: (a) a template engine 310A1 to create resource creation requests from package content; and (b) a k8s API call handler 310A2 for handling k8s API calls for sending resource creation requests to k8s cluster.

A Helm client device 310 can do the following: (a) install a Helm package; (b) upgrade the Helm package.

The Helm client device 310 provides the preceding functionality through the following components: (a) a command line tool, helm, which provides the user interface to all Helm functionality; (b) the Helm packaging format, called charts; and (c) a curated charts repository with prepackaged charts for popular open-source software projects.

Helm packages are called charts, and they include a few YAML configuration files and some templates that are rendered into Kubernetes manifest files. Charts can include the following directories and/or files:

charts: Manually managed chart dependencies can be placed in this directory, though it is typically better to use requirements.yaml to dynamically link dependencies.

templates/: This directory includes template files that are combined with configuration values (from values.yaml and the command line) and rendered into Kubernetes manifests.

Chart.yaml: A YAML file with metadata about the chart, such as chart name and version, maintainer information, a relevant website, and search keywords.

Helm client-tool enables us to verify integrity and origin of the chart by comparing it to the corresponding provenance record before deployment. A provenance file includes (a) YAML content of a chart and required information for verification such as signature of a chart, signed content.

Figure 4:
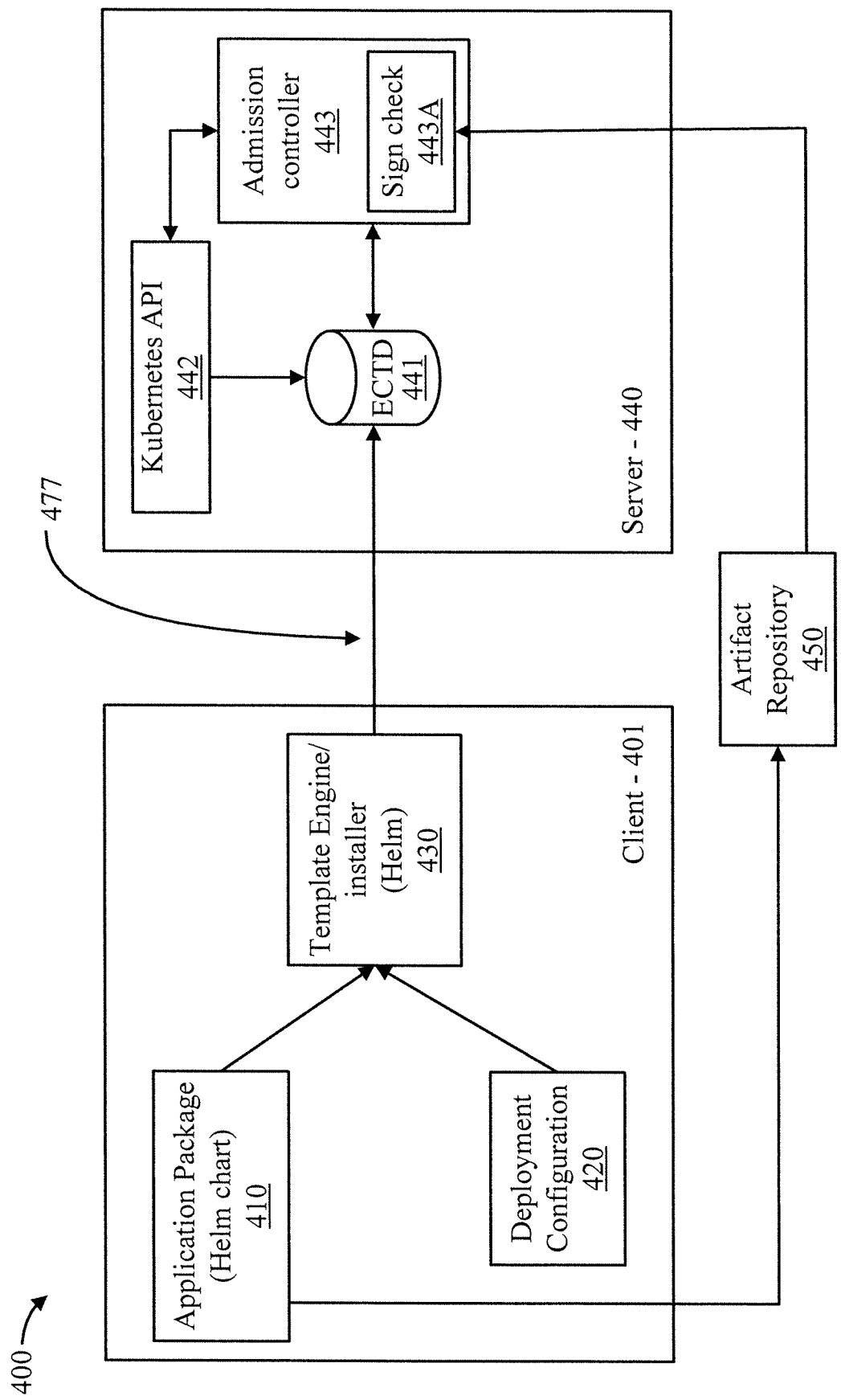
FIG. 4 is a block diagram showing an exemplary Helm application package and deployment scenario, in accordance with an embodiment of the present invention.

In relation to the k8s cluster, a node, also known as a worker or a minion, is a machine where containers (workloads) are deployed. Every node in the cluster runs a container runtime such as Docker, as well as other components, for communication with the primary for network configuration of these containers FIG. 4 is a block diagram showing an exemplary Helm application package and deployment scenario 400, in accordance with an embodiment of the present invention.

The scenario 400 involves a client 401 and a k8s cluster 440.

The client 401 includes a package (Helm chart) 410, a deployment configuration (values.yaml) 420, a template engine/application installer (Helm) 430.

The k8s cluster 440 includes a ETCD 441, a Kubernetes Application Programming Interface (API) 442, an admission controller 443, and an artifact (signature) repository 450.

A Helm-based package deployment creates a series of resource creation requests to the k8s cluster 440.

A K8s resource definition (YAML) 477 is provided from the template engine/installer 430 to the Kubernetes API 442.

The ETCD 441 is a persistent, lightweight, distributed, key-value data store that reliably stores the configuration data of the cluster, representing the overall state of the cluster at any given point of time. The configuration data can be obtained from the ETCD 441 through the API 442.

The API 442 can use, for example, JSON over HTTP, which provides both the internal and external interface to Kubernetes. The API 442 processes and validates REST requests and updates the state of the API objects in the ETCD 441, thereby allowing clients to configure workloads and containers across worker nodes. In one or more embodiments, the present invention intercepts incoming creation requests to k8s API server. Then, the present invention enforces integrity on resources in requests by allowing or rejecting them to be created.

The admission controller 443 performs integrity enforcement. The admission controller 443 (a) checks if an application package comes from a trustworthy source, i.e., an owners identity can be verified and trusted using its signature, (b) enforce its integrity by ensuring content has not been altered in transit since it was packaged and signed. In additional, after initial deployment, the admission controller 443 enforces integrity over the configuration changes to a deployed application package or an individual resource.

In the case of an integrity violation, the admission controller 443 prevents both deployment of unauthorized workloads as well as resource changes. Moreover, the admission controller 443 records all enforcement actions for audit purposes.

A controller manager (shown in FIG. 2 as element 211) is essentially a reconciliation loop that drives actual cluster state toward the desired cluster state, communicating with the API server to create, update, and delete the resources it manages (pods, service endpoints, etc.). The controller manager manages a set of core Kubernetes controllers. For example, one type of controller is the admission controller 443.

A description will now be given regarding Helm based application deployment, in accordance with an embodiment of the present invention.

During a deployment of an application package, Helm renders the combination of chart's templates and deployment configuration into k8s manifests. Then, Helm deploys them via k8s API. This creates a release object (aka "Release Secret" in k8s), which represents a specific configuration and deployment of the chart on a cluster, as first step.

A description will now be given of a particular feature of the present invention.

In Kubernetes, a secret is an object that includes a small amount of sensitive data such as a password, a token, or a key. Such information might otherwise be put in a Pod specification or in an image. Users can create secrets and the system also creates some secrets.

A Helm "release secret" is a particular type of secret in accordance with the present invention that is used in order to facilitate the release of a Helm package deployment responsive to one or more verifications using the release secret. In an embodiment of the present invention, a release manifest is encoded and included as a release secret (see, e.g., element 607 of FIG. 6).

Figure 5:
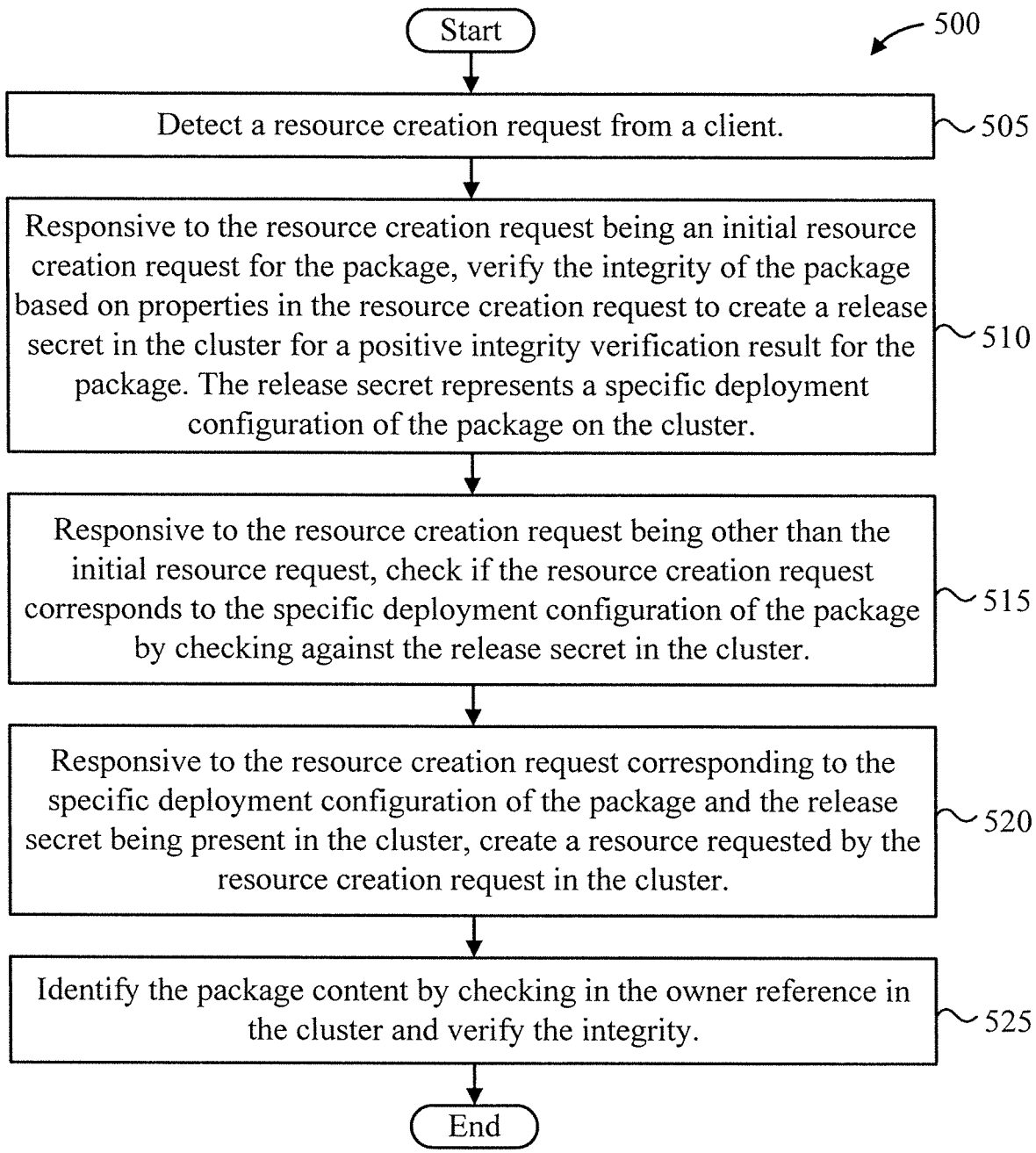
FIG. 5 is a flow diagram showing an exemplary method for preventing unauthorized Helm-based application package deployment and resource changes in a k8s cluster, in accordance with an embodiment of the present invention.

FIG. 5 is a flow diagram showing an exemplary method 500 for preventing unauthorized Helm-based application package deployment and resource changes in a k8s cluster, in accordance with an embodiment of the present invention. The method is executed by an admission control webhook in a cluster. While the method is described with respect to a Helm application for the sake of illustration and concreteness, use of the these teachings for other objects such as, for example, a single YAML based deployment and/or a K8s operator-based application bundle is readily performed by one of ordinary skill in the art. For example, the description below such as relating to FIGS. 11 and 12 addresses these other object types in further detail.

At block 505, detect a resource creation request from a client.

At block 510, responsive to the resource creation request being an initial resource creation request for an object (for this example going forward, a package, but otherwise can be a single YAML based deployment and/or a k8s operator-based application bundle), verify the integrity of the package based on properties in the resource creation request to create a release secret in the cluster for a positive integrity verification result for the package. The release secret represents a specific configuration and deployment of the package on the cluster. Block 510 corresponds to block 710-714 of FIG. 7, and handles request 1 in FIG. 6).

At block 515, responsive to the resource creation request being other than the initial resource request, check if the resource creation request corresponds to the specific deployment configuration of the package by checking against the release secret in the cluster. Block 515 corresponds to block 720-723 of FIG. 7, and handles requests 2-4 in FIG. 6).

At block 520, responsive to the resource creation request corresponding to the specific deployment configuration of the package and the release secret being present in the cluster, create a resource requested by the resource creation request in the cluster. Block 520 corresponds to block 720-723 of FIG. 7, and handles requests 2-4 in FIG. 6).

At block 525, identify the package content by checking in the owner reference in the cluster and verify the integrity. Block 525 corresponds to blocks 730-732 of FIG. 7, and handles requests 5-6 in FIG. 6.

Figure 6:
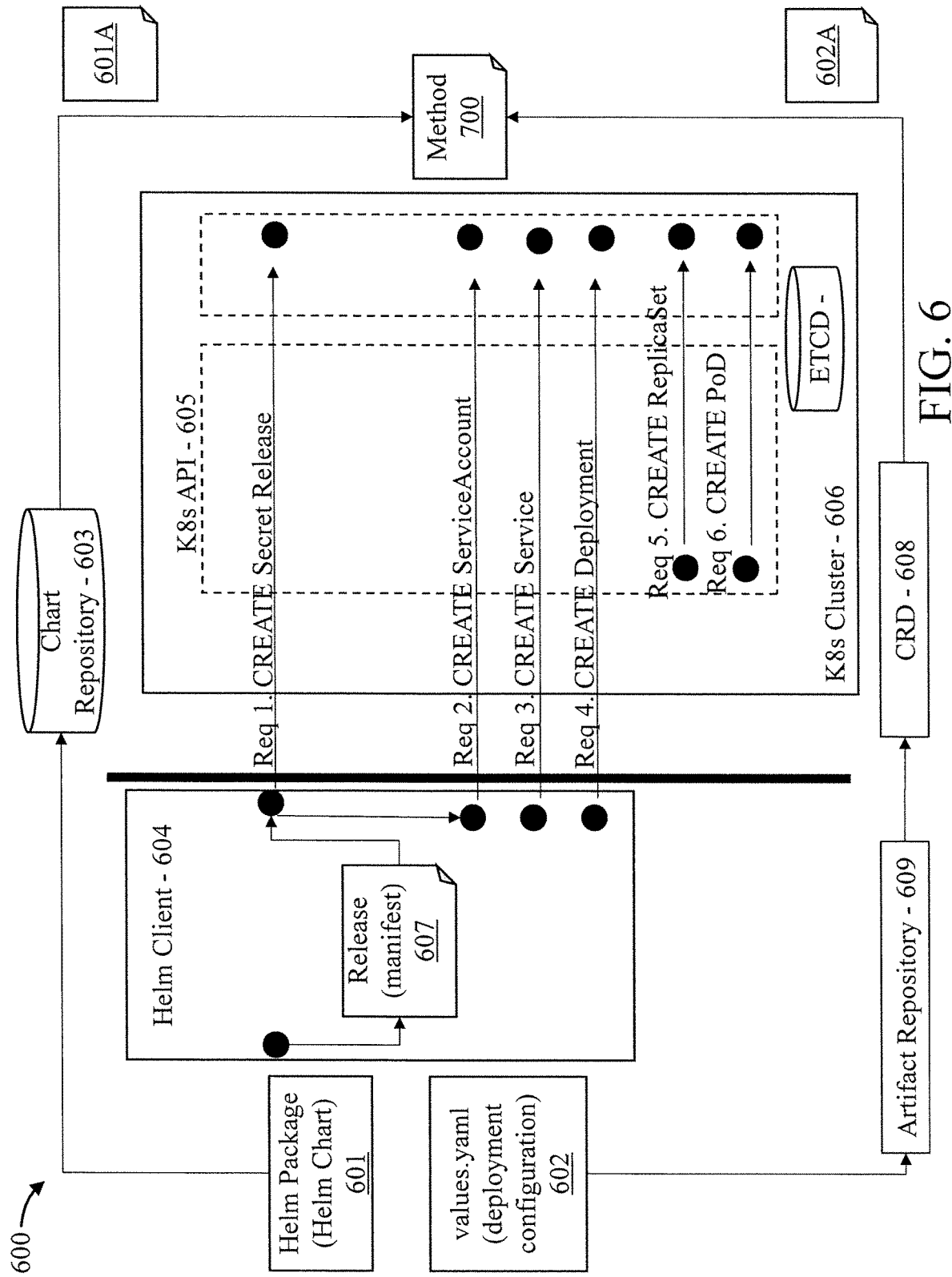
FIG. 6 is a high-level block diagram showing an exemplary system/method to which a method (as set forth in FIGS. 7-8) is applied for preventing unauthorized Helm-based application package deployment and resource changes in a k8s cluster, in accordance with an embodiment of the present invention.
Figure 7:
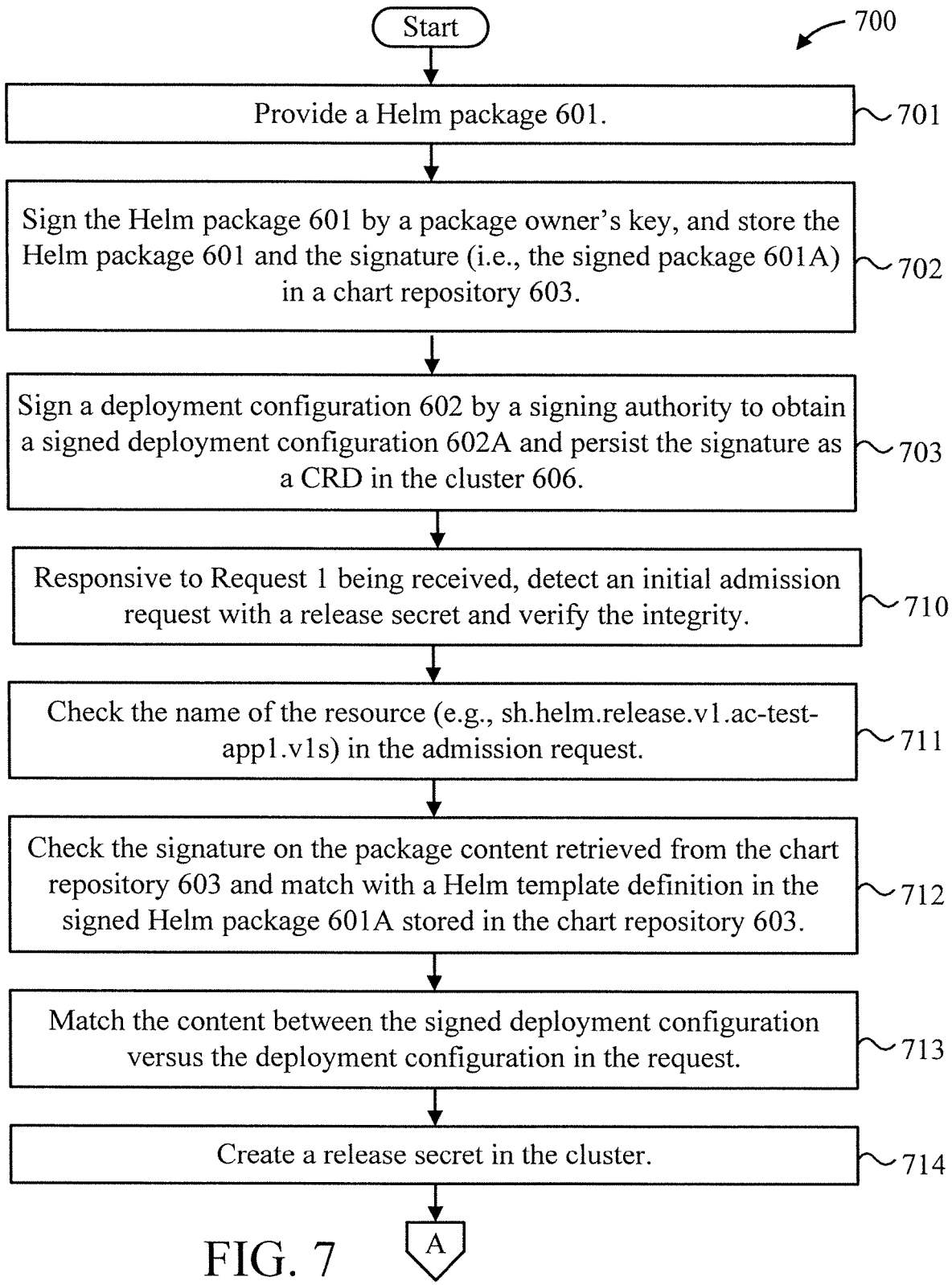
FIG. 7-8 show an exemplary method for preventing unauthorized Helm-based application package deployment and resource changes in a k8s cluster, in accordance with an embodiment of the present invention.
Figure 8:
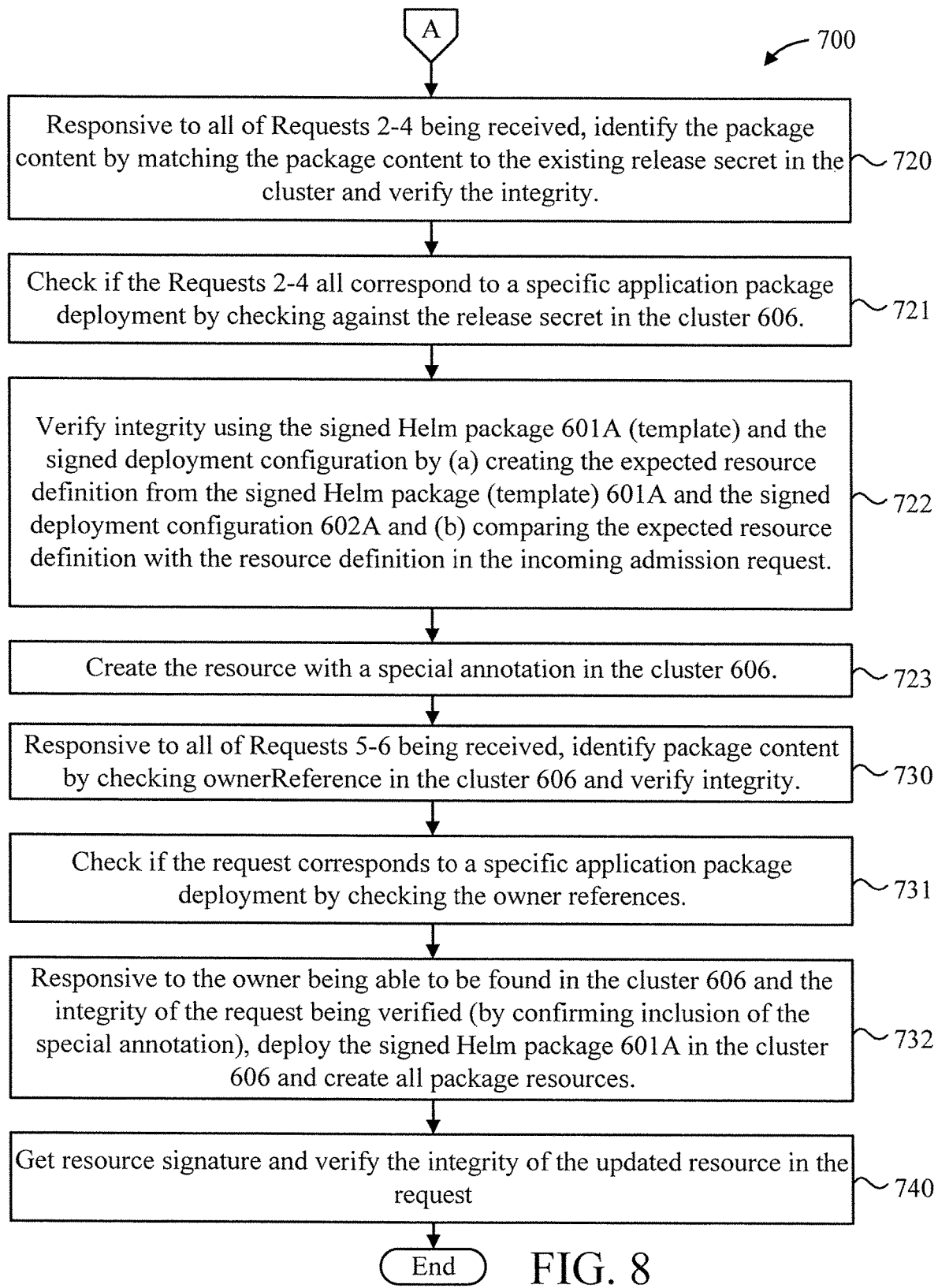

FIGS. 6-8 below essentially describe method 500 in further detail.

FIG. 6 is a high-level block diagram showing an exemplary system/method 600 to which a method (as set forth in FIGS. 7-8) is applied for preventing unauthorized Helm-based application package deployment and resource changes in a k8s cluster, in accordance with an embodiment of the present invention. FIG. 6 can be even be to be an environment in which one or more embodiments of the present invention can be practiced.

The system/method 600 includes a Helm package 601 (e.g., Helm chart), a deployment configuration (values.yaml) 602, a chart repository 603, a Helm client 604, a k8s API 605 of a k8s cluster 606, a package release (manifest) 607, a Custom Resource Definition 608, and an artifact repository 609.

The Helm package 601 is signed by the package owner's key (or, e.g., a notary service) to obtain signed package content 601A.

The deployment configuration 602 is signed by a signing authority to obtain a signed deployment configuration 602A.

The Helm client 604 issues a release (a manifest) from which the following requests are generated by the Helm Client 604:
Request 1 (Req. 1): CREATE Secret Release
Request 2 (Req. 2) CREATE ServiceAccount
Request 3 (Req. 3) CREATE Deployment The k8s API 605 receives the preceding 3 requests and the following requests are generated:
Request 5 (Req. 5): CREATE ReplicaSet
Request 6 (Req. 6): CREATE PoD The resources are not limited to the preceding, but are shown for the sake of illustration. In other embodiments, resources can include ConfigMap for example.

The following requests are generated because of the owner dependent relationships.
Owner->dependent (creating an owner leads to creation of its dependent)
Deployment->ReplicaSet
ReplicaSet->Pod
Again, this is k8s' internal mechanism.

FIG. 7-8 show an exemplary method 700 for preventing unauthorized Helm-based application package deployment and resource changes in a k8s cluster, in accordance with an embodiment of the present invention.

At block 701, provide a Helm package 601.

At block 702, sign the Helm package 601 by a package owner's key, and store the Helm package 601 and the signature (i.e., the signed package 601A) in a chart repository 603.

At block 703, sign a deployment configuration 602 by a signing authority to obtain a signed deployment configuration 602A and persist the signature as a CRD in the cluster 606.

At block 710, responsive to Request 1 being received, detect an initial admission request with a release secret and verify the integrity.

In an embodiment, block 710 includes one or more of blocks 711-714.

At block 711, check the name of the resource (e.g., sh.helm.release.v1.ac-test-appl.v1s) in the admission request.

At block 712, check the signature on the package content retrieved from the chart repository 603 and match with a Helm template definition in the signed Helm package 601A stored in the chart repository 603.

At block 713, match the content between the signed deployment configuration versus the deployment configuration in the request.

At block 714, create a release secret in the cluster.

At block 720, responsive to all of Requests 2-4 being received, identify the package content by matching the package content to the existing release secret in the cluster and verify the integrity.

In an embodiment, block 720 includes one or more of blocks 721-723.

At block 721, check if the Requests 2-4 all correspond to a specific application package deployment by checking against the release secret in the cluster 606.

At block 722, verify integrity using the signed Helm package 601A (template) and the signed deployment configuration by (a) creating the expected resource definition from the signed Helm package (template) 601A and the signed deployment configuration 602A and (b) comparing the expected resource definition with the resource definition in the incoming admission request.

At block 723, create the resource with a special annotation in the cluster 606. The special annotation indicating a positive integrity verification result.

At block 730, responsive to all of Requests 5-6 being received, identify package content by checking ownerReference in the cluster 606 and verify integrity.

In an embodiment, block 730 includes one or more of blocks 731-734.

At block 731, check if the request corresponds to a specific application package deployment by checking the owner references.

At block 732, responsive to the owner being able to be found in the cluster 606 and the integrity of the request being verified (by confirming inclusion of the special annotation), deploy the signed Helm package 601A in the cluster 606 and create all package resources (secret, service, deployment, etc.). Block 732 handles requests to create internal resources such as, for example, ReplicaSet and Pod per Requests 5 and 6, respectively. Secret and ServiceAccount are handled by the above steps.

At block 740, get resource signature and verify the integrity of the updated resource in the request.

FIG. 9 is a diagram showing an exemplary pseudocode 900 for a release secret, in accordance with an embodiment of the present invention.

The pseudocode 900 includes a "data.release" portion 910 which includes the encoded release manifest 607 which is decoded as shown in FIG. 10.

FIG. 10 is a diagram showing an exemplary pseudocode 1000 for a decoded data release, in accordance with an embodiment of the present invention.

Thus, in accordance with the present invention, data can be used to identify succeeding requests by decoding "data.release" portion 910 of the release secret into the pseudocode 1000 as shown in FIG. 10. For example, in pseudocode 1000, "templates/deployment.yaml" will be used by Request #4 in FIG. 6.

Herein, integrity enforcement is described with respect to the following 3 cases (as shown in FIGS. 11 and 12):

(1) Single YAML based deployment
(2) Helm based application package
(3) K8s operator-based application bundle—(this is similar to case #1, as deploying a k8s operator-based application package to cluster involves creating a bunch of k8s manifest in YAML)

For the sake of illustration, the detailed description is focused on case #2. However, given the teachings of the present invention provided herein, one of ordinary skill in the art can readily apply the present invention to cases #1 and #3.

A description will now be given regarding K8s operators, in accordance with an embodiment of the present invention.

A k8s operator is a way to package, deploy and automatically manage a k8s application over its lifetime. Operator SDK generates a bundle which includes several manifest files for deploying an operator on a k8s cluster.

One of the manifest files includes a Custom Resource (CR), which is the end point to k8s added by an Operator. Custom Resource Definition (CRD) models an application's underlying business logic. CRD is the specification of what constitutes a CR. Deploying an operator bundle involved creating the resources in the manifest files in a cluster.

An overview will now be given regarding cluster side integrity enforcement, in accordance with an embodiment of the present invention.

The present invention is configured to (a) provide a cluster-side integrity enforcement over application packages without relying any client-side verification, (b) handle the variations in application packaging and deployments, and (c) prevent unauthorized resource configurations changes on application packages during their entire lifetime. In addition, our method also aims to make no changes in application bundles or packaging tools while enforcing integrity.

FIG. 6 illustrates an overall architecture for enacting integrity over application workloads (plain manifests in YAML or Helm charts or k8s operators) being deployed on a cluster.

First, one or more embodiments of the present invention can require (a) plain k8s manifests in YAML format (b) a Helm chart, (c) a k8s operator to be digitally signed using a certificate which can be recognized and approved by an authority. However, the present invention does not rely on if client-tools verify their integrity.

Second, at cluster-side, the present invention enforces integrity over the variations of application packages deployed on cluster. The present invention (a) checks if an application package comes from a trustworthy source, i.e. an owner's identity can be verified and trusted using its signature, (b) enforce its integrity by ensuring content has not been altered in transit since it was packaged and signed. In addition, after the initial deployment, the mechanism enforces integrity over the configuration changes to a deployed application package or an individual resource.

In case of an integrity violation, the present invention prevents both deployment of unauthorized workloads as well as resource changes. Moreover, the present invention records all enforcement actions for audit purposes.

A description will now be given regarding integrity enforcement using a mutating webhook admission controller.

One or more embodiments of the present invention encapsulate the core idea that enforces integrity at cluster-side and implement it as a custom logic in a mutating admission webhook in k8s as seen in FIG. 6. This is because deployment of all variations of applications packages must go through a common gate at a cluster—k8s API server which includes webhooks in its admission control chain as seen in FIG. 2.

During a deployment of a plain manifest in YAML or an application package or k8s operator, the built-in cluster-side enforcement mechanism encapsulated in a mutating admission webhook intercepts requests received by k8s API server to impose integrity on them. It processes each incoming request and determine its verdict (Allow or Reject) based on the logic provided in FIGS. 11 and 12. In addition, our approach annotates a resource in an incoming request by adding a flag "integrity Verified=true" if it establishes its integrity.

Hereafter, the digital signing of the following three types of workloads is described: (a) a plain k8s manifest in YAML format; (b) a Helm chart; and (c) a k8s operator. The three scenarios are identified as Case A, Case B, and Case C, respectively.

A description will now be given regarding signing individual resources at the client-side (Case A), in accordance with an embodiment of the present invention.

It is presumed that a single resource manifest is intended to be created in YAML format on a cluster protected by the integrity enforcement mechanism of the present invention. For this, the present invention requires the resource manifest to be digitally signed and its signature be made available on a cluster. Like creation, updating an existing resource also requires a signature.

In accordance with an embodiment, signing a resource (a new one or an update to an existing one) in a plain k8s manifest requires an authorized owner to create a "ResourceSignature" on a cluster. A "ResourceSignature" is a special resource type. This stores a signature of a resource in a cluster. Our cluster-side enforcement mechanism uses a "ResourceSignature" to confirm a resource's integrity.

To create a "ResourceSignature", our approach provides a template. A resource signature template includes several key fields: "MESSAGE", "SIGNATURE", "RSIG_SIGNATURE".

An authorized entity needs to fill in a "ResourceSignature" template using the values (name, API version, kind, etc.) of a target resource they want to sign. "MESSAGE" is generated by creating an encoded (base64) content of the target resource. They may use standard tools like PKI, GnuPG, and so forth to create a signature which is filled in for the field: "SIGNATURE".

Further, a "ResourceSignature" includes another field called "RSIG_SIGNATURE" which refers to the signature of "ResourceSignature" itself. This is required because a "ResourceSignature" is also a k8s resource that needs to be created on a cluster and its integrity must be enforced. To generate "RSIG_SIGNATURE", standard tools such as, for example, PKI, GnuPGk, and so forth, can be used. An authorized entity must generate signature for the specification section of a "ResourceSignature" after it is filled in.

A description will now be given regarding signing application packages at the client-side (Case B), in accordance with an embodiment of the present invention.

The general structure of an application package includes: (a) k8s resource templates; and (b) a deployment configuration.

An application package installer (e.g., Helm) renders the combination of k8s resource templates and deployment configurations into k8s manifests in YAML format. Then, it deploys them to a cluster by sending individual creation requests to a k8s API server. Therefore, signing an application package requires that each of the rendered k8s manifests is signed (i.e., to create "ResourceSignature") so that when it arrives as a request at k8s API server, a cluster-side mechanism could enforce integrity using its signature. This approach requires changes to application package installers as the rendered k8s manifests are an internal representation of an installer.

Our approach aims to make no changes to application package installers or bundles. Therefore, we design our method to sign an application package as a single artifact. For a concrete example, in case of Helm, our approach uses a provenance record, which includes a signature for enforcing integrity (Case B).

A description will now be given regarding signing K8s operators at the client-side (Case C), in accordance with an embodiment of the present invention.

Deploying a k8s operator bundle on a cluster involves creating the resources specified in k8s manifest files in a bundle (i.e., "deploy" directory of an operator bundle. Therefore, the present invention requires these manifest files are to be digitally signed. Since these are plain k8s manifests in YAML format, an authorized entity needs to generate a "ResourceSignature" using a template for each of them. Once a "ResourceSignature" manifest is generated, it needs to be created in a cluster where the operator to be deployed.

A description will now be given regarding

A description will now be given of cluster-side integrity enforcement in further details, in accordance with an embodiment of the present invention.

FIGS. 11 and 12 illustrate the pseudocode steps that can be involved in various embodiments of cluster-side enforcement mechanism in accordance with the present invention. This mechanism handles different workloads such as a plain k8s manifest in YAML format (Case A) or a Helm chart (Case B) or a k8s operator (Case C). How the present invention handles each case will now be described as follows.

(1) Input: FIG. 11 shows that an input is a request received by a k8s API. A request carries information (name type, kind, namespace etc.) regarding the resource to be created or updated or deleted.

(2) Output: FIG. 12 indicates that an output is a decision: "ALLOW" or "REJECT". In case of "ALLOW", the method may annotate a resource with a flag to indicate its integrity was verified (section R 6 in FIG. 12). For rejections, it would include a reason in a response (section R 7 in FIG. 12).

(3) Internal Requests by K8s: The first step of the enforcement mechanism checks if an incoming request was generated by k8s's internal components as seen in FIG. 11. This type of requests can be identified based on the request properties such as user, service account that are internal to k8s, which are assumed to be trusted.

Next, for other requests, our approach checks if an operation is of type: CREATE or UPDATE.

(4) Creation Requests: For cases A or B or C, "HandleCreationRequest" includes the steps to enforce integrity over creation requests. We describe the steps in sections R1, R2, R3 and R4 in FIG. 12.

(a) Handling initial creation requests (R1 in FIG. 12): For case B, "HandleCreationRequest" first checks if a request indicates a package deployment initiation (section R1 in FIG. 10). For instance, during a chart deployment, Helm sends a request to create a resource called "Release Secret". This is always the first request sent by Helm installer to k8s API, hence it indicates a chart deployment's initiation. In addition, the first request carries information regarding a bundle (e.g., resources in it). For instance, a Helm release secret stores a release—a running instance of a chart in a cluster.

Next step in section R1 enforces integrity of the resource in an initial request. More concretely, in the Helm case, the enforcement mechanism obtains the release name from the request. Then, using the release name, it retrieves the corresponding chart and its provenance record from an artifact repository. By using the signature in the provenance record, the mechanism enforces integrity of the resource in an initial request. Specifically, it checks (1) an authorized owner signed a chart found in the repository (2) its content was not tampered with since it was bundled. For (2), it compares the content from the release resource in the request with expected content from the chart found in a repository to check if any tampering happened in transit. If successful integrity enforcement is achieved, then the release object would be created in a cluster and then the rest of the requests would be sent by the installer to the k8s API server. If an initial request failed to pass integrity check, then a package installation would terminate.

(b) Handling follow-up requests (R2 in FIG. 12): In the Case B, there would be a set of follow up requests to create resources in a package after an initial object is created. For such resources, our approach tries to associate them to a verified resource object that indicates a package installation initiation (e.g., a "Release Secret" in the Helm's case). Presume a chart includes a "ConfigMap" resource and Helm sends a request to k8s API to create it. The present invention checks if "ConfigMap" can be associated to any of the verified "Release Secret" objects in a cluster. Since a "Release Secret" includes all resources in a chart, it is possible to check if it includes a particular resource by matching its properties such as name, kind, API version, and so forth.

(c) Handling requests with dependent resources (R3 in FIG. 12): The steps in section R3 concern about creation of resources that are dependent of other resources. K8s maintains owner-dependent relationships among some of its resource. For instance, a "ReplicaSet" is the owner of a set of "Pods" and a "ReplicatSet" is owned by a "Deployment". Each dependent object has "ownerReferences" metadata that refers to owning object. For the dependent resources in cases A or B or C, if an integrity verified owner could be found in the ownership hierarchy, the present invention confirms their integrity.

(d) Handling request with other resources (R4 in FIG. 12): For other resource creation requests not covered by sections R1 or R2 or R3, our approach requires a "ResourceSignature" to be available in a cluster before creating a resource. If a "ResourceSignature" can be found (by matching resource properties such as name, kind, API version, and so forth), it enacts integrity of the resource in a request. A "ResourceSignature" includes a "MESSAGE" field which includes an encoded content of resource manifest. The present invention compares the content of the resource manifest in a request with "MESSAGE" field in a corresponding "ResourceSignature". If successful matching is achieved, then the present invention approach confirms integrity over the resource in a request.

(5) Update Requests (R5 in FIG. 12): For resource updates, one or more embodiments of the present invention can require a "ResourceSignature" to be present in a cluster before updating it. For an update request for a resource, the present invention finds a corresponding "ResourceSignature". If a resource signature exists, it is matched to the content of a changed resource manifest in a request and "MESSAGE" field in a corresponding "ResourceSignature". If successful, then it confirms the integrity of the changed resource and allows the changes to be persisted. If not, then the present invention rejects the update of a resource with a reason "no valid signature found".

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
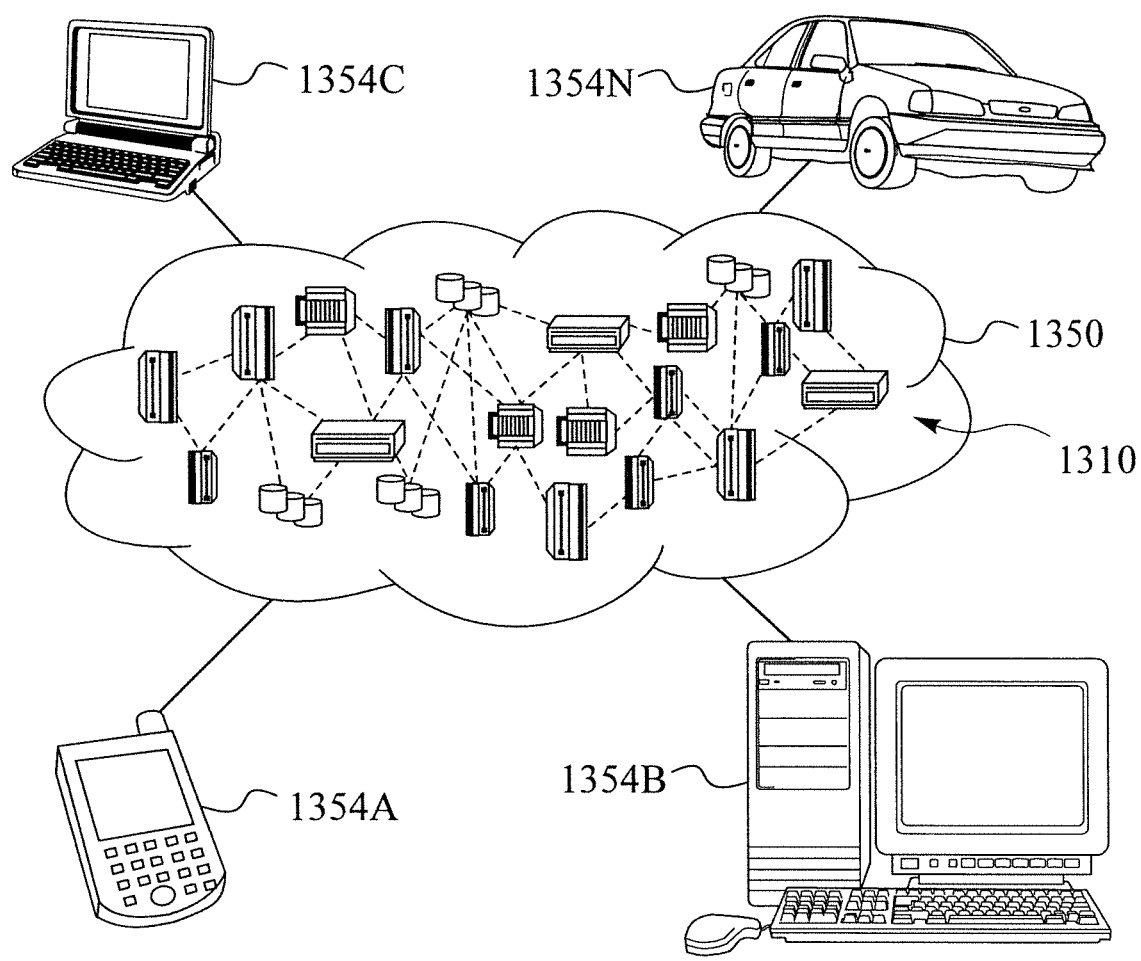
FIG. 13 is a block diagram showing an illustrative cloud computing environment having one or more cloud computing nodes with which local computing devices used by cloud consumers communicate, in accordance with an embodiment of the present invention.

Referring now to FIG. 13 illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1154C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
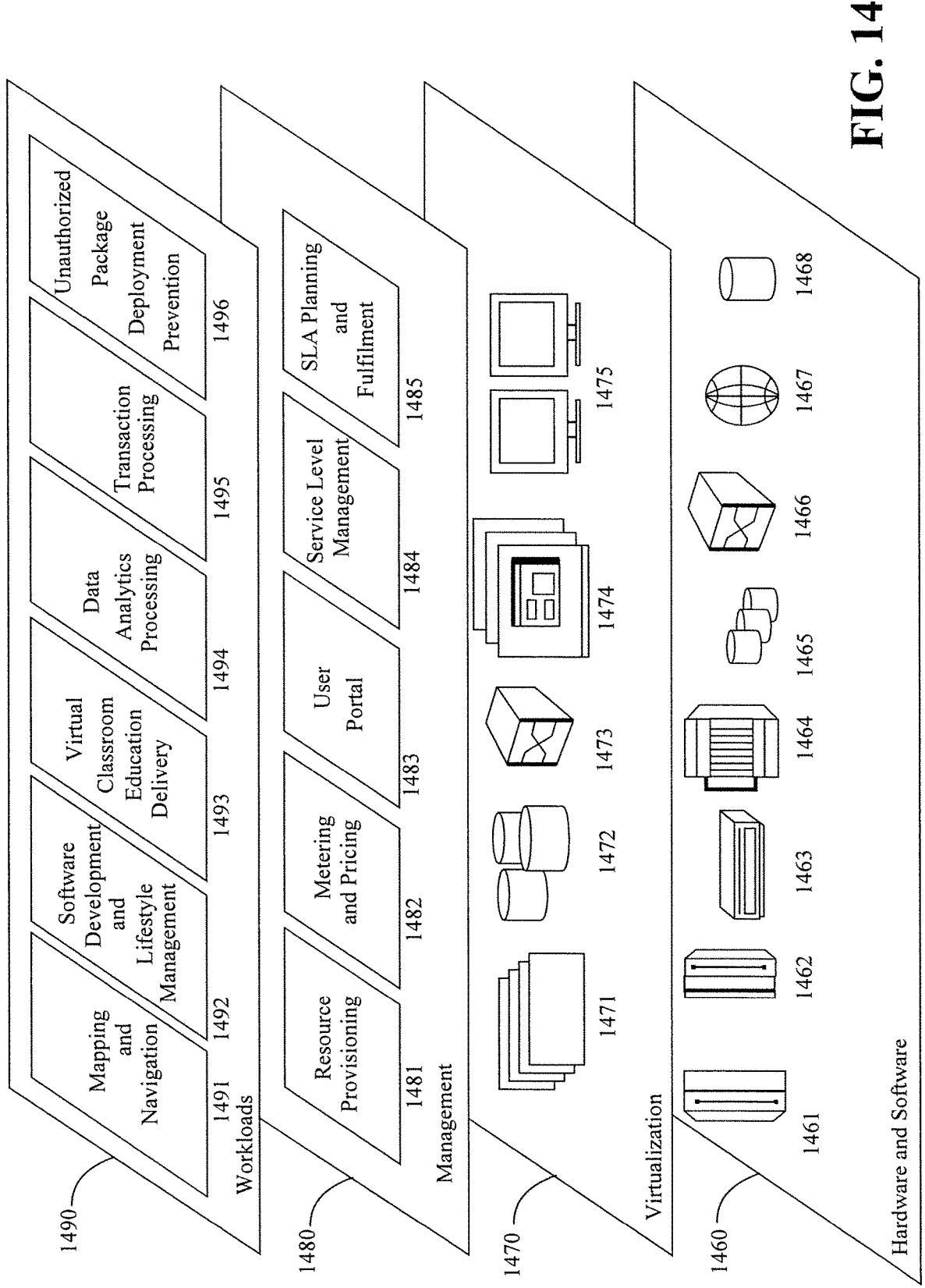
FIG. 14 is a block diagram showing a set of functional abstraction layers provided by a cloud computing environment, in accordance with an embodiment of the present invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and unauthorized package deployment prevention 1496.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed by a server in a cluster for checking an integrity of an object to be deployed to the cluster, comprising:
    detecting a resource creation request from a client;
    responsive to the resource creation request being an initial resource creation request for the object, verifying the integrity of the object based on properties in the resource creation request to create a release secret in the cluster for a positive integrity verification result for the object, the release secret representing a specific deployment configuration of the object on the cluster;
    responsive to the resource creation request being other than the initial resource request, checking if the resource creation request corresponds to the specific deployment configuration of the object by checking against the release secret in the cluster; and
    responsive to the resource creation request corresponding to a deployment of the object and the release secret being present in the cluster, creating a resource requested by the resource creation request in the cluster.

2. The computer-implemented method of claim 1, wherein verifying the integrity of the object comprises:
    checking a name of the resource requested by the resource creation request;
    checking a signature on an object content retrieved from a repository; and
    matching between a template definition in the signature on the object and a definition in the resource creation request; and matching between a signed deployment configuration in a database and a deployment configuration in the resource creation request, responsive to the name of the resource and the signature being found.

3. The computer-implemented method of claim 1, wherein checking if the resource creation request corresponds to the specific deployment configuration of the object comprises:
    creating an expected resource definition from a signed template and the specific deployment configuration; and
    comparing the expected resource definition with a resource definition in the resource creation request.

4. The computer-implemented method of claim 1, further comprising:
    checking if the resource creation request corresponds to the specific deployment configuration of the object by checking if an identifier of an owner of object content of the object is found in the cluster;

responsive to the identifier of the owner being found in the cluster, verifying an integrity of the object and creating the resource with an annotation in the cluster, the annotation indicating the positive integrity verification result; and blocking any incoming update requests responsive to the annotation lacking being found in the resource.

5. The computer-implemented method of claim 1, wherein verifying the integrity of the object is performed solely at the cluster.

6. The computer-implemented method of claim 1, wherein verifying the integrity of the object is performed using a mutating admission webhook in the cluster.

7. The computer-implemented method of claim 6, wherein the mutating admission webhook intercepts the resource creation request to impose an integrity check on the resource creation request.

8. The computer-implemented method of claim 1, wherein verifying the integrity of the object using the secret release is performed for both creation of the object and updating of the object.

9. The computer-implemented method of claim 1, wherein verifying the integrity of the object includes adding an annotation to indicating the positive integrity verification result for a package.

10. The computer-implemented method of claim 1, wherein verifying the integrity of the object uses a signature of a resource signature.

11. The computer-implemented method of claim 10, wherein the signature is detected as an artifact associated with the specific deployment configuration.

12. The computer-implemented method of claim 1, wherein the release secret stores a release embodying a running instance of the object in the cluster.

13. The computer-implemented method of claim 1, wherein verifying the integrity of the object comprises:

checking whether an authorized owner signed a chart corresponding to the object and found in a repository; and checking whether a content of the chart was untampered with since the content of the chart was bundled.

14. The computer-implemented method of claim 13, wherein checking whether the content of the chart was tampered with comprises comparing a content from a release source in the resource creation request with expected content from the chart found in the repository.

15. The computer-implemented method of claim 1, further comprising handling variations in object packaging and deployments by ensuring the variations are associated with, and verified against, a signature from a repository or in the cluster.

16. The computer-implemented method of claim 1, wherein the object is a software package.

17. The computer-implemented method of claim 1, wherein the object is a single YAML Ain't Markup Language (YAML)-based deployment.

18. The computer-implemented method of claim 1, wherein the object is an operator-based application bundle.

19. A computer program product, the computer program product comprising a non-transitory computer readable storage medium having program instructions embodied therewith, the program instructions executable by a computer to cause the computer to perform a method executed by a server in a cluster for checking an integrity of an object to be deployed to the cluster, the method comprising:

detecting a resource creation request from a client;

responsive to the resource creation request being an initial resource creation request for the object, verifying the integrity of the object based on properties in the resource creation request to create a release secret in the cluster for a positive integrity verification result for the object, the release secret representing a specific deployment configuration of the package on the cluster;

responsive to the resource creation request being other than the initial resource request, checking if the resource creation request corresponds to the specific deployment configuration of the object by checking against the release secret in the cluster; and responsive to the resource creation request corresponding to a deployment of the object and the release secret being present in the cluster, creating a resource requested by the resource creation request in the cluster.

20. A server in a cluster for checking an integrity of an object to be deployed to the cluster, the server comprising:

a memory configured to store program code; and a hardware processor configured to run the program code to:

detect a resource creation request from a client;

responsive to the resource creation request being an initial resource creation request for the object, verify the integrity of the package based on properties in the resource creation request to create a release secret in the cluster for a positive integrity verification result for the object, the release secret representing a specific deployment configuration of the object on the cluster;

responsive to the resource creation request being other than the initial resource request, check if the resource creation request corresponds to the specific deployment configuration of the object by checking against the release secret in the cluster; and responsive to the resource creation request corresponding to a deployment of the package and the release secret being present in the cluster, create a resource requested by the resource creation request in the cluster.

* * * * *